United States Patent
Schrag et al.

(10) Patent No.: US 7,644,612 B2
(45) Date of Patent: Jan. 12, 2010

(54) THERMAL MASS FLOW METER AND METHOD FOR ITS OPERATION

(75) Inventors: Daniel Schrag, Zürich (CH); Detlef Pape, Nussbaumen (CH)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 12/153,515

(22) Filed: May 20, 2008

(65) Prior Publication Data

US 2008/0289411 A1   Nov. 27, 2008

(30) Foreign Application Priority Data

May 21, 2007   (DE) ................. 10 2007 023 840

(51) Int. Cl.
*G01F 1/68* (2006.01)
(52) U.S. Cl. .................................. 73/204.11
(58) Field of Classification Search ......... 73/204.11, 73/204.17, 204.23, 204.27, 204.15, 204.26, 73/204.22
See application file for complete search history.

(56) References Cited

U.S. PATENT DOCUMENTS

| | | | | |
|---|---|---|---|---|
| 4,637,253 A | * | 1/1987 | Sekimura et al. | 73/170.12 |
| 4,787,251 A | * | 11/1988 | Kolodjski | 73/755 |
| 4,841,938 A | * | 6/1989 | Weibler et al. | 123/494 |
| 5,817,933 A | * | 10/1998 | Daetz | 73/114.32 |
| 6,681,625 B1 | * | 1/2004 | Berkcan et al. | 73/204.23 |
| 6,973,826 B2 | * | 12/2005 | Matsumoto et al. | 73/204.15 |

FOREIGN PATENT DOCUMENTS

| | | |
|---|---|---|
| DE | 31 35794 A1 | 3/1983 |
| DE | 33 04710 A1 | 8/1984 |
| DE | 34 17 051 C2 | 11/1985 |
| DE | 102 18 117 B4 | 11/2003 |
| DE | 10 2005 019 614 A1 | 12/2005 |
| DE | 10 2004 039 543 A1 | 3/2006 |
| DE | 10 2004 058553 A1 | 6/2006 |
| EP | 0 314 325 A1 | 5/1989 |
| EP | 1 291 622 A2 | 3/2003 |
| EP | 1 310 775 A1 | 5/2003 |
| EP | 1 396 709 A1 | 3/2004 |
| EP | 1 452 838 A2 | 9/2004 |
| WO | WO 2004/018976 A3 | 3/2004 |

OTHER PUBLICATIONS

German Search Report.

* cited by examiner

*Primary Examiner*—Jewel Thompson
(74) *Attorney, Agent, or Firm*—Buchanan Ingersoll & Rooney PC

(57) ABSTRACT

The disclosure relates to a thermal mass flow meter for determining a material flow through a vessel. The mass flow meter has at least two measuring elements immersed into a vessel with a flowing medium, with one of the measuring elements being heated. It is proposed that the heated measuring element is arranged in front of the unheated measuring element in the flow direction of the medium for at least part of the time, and for part of the time the unheated measuring element is arranged in front of the heated measuring element.

11 Claims, 2 Drawing Sheets

THERMAL MASS FLOW METER AND METHOD FOR ITS OPERATION

RELATED APPLICATION

This application claims priority under 35 U.S.C. §119 to German Patent Application No. 10 2007 023 840.3 filed in Germany on May 21, 2007, the entire content of which is hereby incorporated by reference in its entirety.

TECHNICAL FIELD

The disclosure relates to a thermal mass flow meter for determining a material flow through a vessel and to a method for its operation.

BACKGROUND INFORMATION

Such mass flow meters have long been known. The measuring principle of thermal mass flow meters is based on the cooling of a heating element mounted on a holder when immersed into a flowing fluid. The flow which flows over the surface of the heating element absorbs heat from the latter and thus cools the heating element. The construction and behavior are illustrated in principle in FIG. 4. In this case, the quantity of heat absorbed by the flow depends on the temperature difference between the surface and the fluid, and on the flow itself. It can be described by a function $$\dot{q} = \alpha(T_O - T_F),$$

where $\dot{q}$ is the quantity of heat dissipated, $(T_O - T_F)$ is the temperature difference, and $\alpha$ is a constant of proportionality.

The constant of proportionality $\alpha$ is in this case directly dependent on the flow and is a function of the mass flow density over the heating element $\alpha = f(\rho v) \sim \sqrt{\rho v}$. Now, if the temperature difference between the surface and the fluid, and also the heating power required to generate this temperature difference, are known, the mass flow over the heating element can thus be determined from this.

Therefore, for practical application of such a thermal mass flow measurement, two temperature sensors, one of which is heated and used for the flow measurement, are now put into the flow as illustrated in FIG. 5. The second temperature sensor serves to measure the fluid temperature $T_F$.

In general, the measurement is in this case carried out only statically with a constant heating power or a constant temperature difference between the heater and the flow. However, a pulsed mode of operation, which is evaluated with slightly more effort, could also be carried out in this case.

The low directional sensitivity of the sensor is a peculiarity of this thermal mass flow measurement. The cooling effect of the flow on the sensor is determined to a first approximation by the magnitude of the flow velocity and not by its direction, so that the direction only has a small influence on the measured signal. The flow can thus be incident on the sensor from any direction. This only leads to a small change in the measured signal and to correspondingly small measuring errors. This has the advantage that the sensors do not react as sensitively to deviations from a perpendicular oncoming flow as are caused by installation tolerances, for example. Furthermore, for this reason, thermal flow sensors are also often constructed as symmetrically as possible in order to further reduce such measuring errors.

However, it is disadvantageous in this case that forward and reverse flows in a pipe cannot be distinguished by a simple thermal sensor. However, in the process, fluctuations in the flow are often caused by external influences and by the different components in the system, so that the flow does not always flow past the sensor in one direction, but backflows can also occur. This occurs in particular in the case of low flows. Since the sensor registers this flow independently of the flow direction, the backflow is also counted positively, which can lead to large erroneous measurements in the case of small flows and to the display of a flow in the case of zero flow. A direction detection of the flow is thus required to avoid such erroneous measurements.

The sensors are also in general calibrated in a preferred direction. They then nevertheless indicate approximately correct values in the case of being installed the wrong way round by 180°, so that the incorrect installation cannot be detected immediately due to a very unusual flow rate signal. The measuring errors resulting from the incorrect installation position are significantly higher than in the case of a correct installation position. In this case too, direction detection is advantageous to immediately generate a corresponding error message in the case of an incorrect installation position.

DE 33 04 710 A1 discloses for direction detection analyzing the behavior of the flow signal near the zero crossing in particular, and deriving a sign change from this. However, a prerequisite for this method is that information about the type of application in which the sensor is used is available in order to be able to form a corresponding model. For this reason, this can only be implemented with great difficulties in the case of a universal flow meter. The sensors are also not linked to another in many applications, so that additional information is not available. An incorrect installation can thus also not be detected in this way.

DE 34 17 051 C2, DE 102 18 117 B4, DE 31 35 794 A1 and DE 10 2004 039 543 A1 similarly use additional external information about the pulsation generator, in this case an internal combustion engine, in order to synchronize the flow measurement with the pulsation and thus avoid erroneous measurements. The disadvantages are comparable to those in the previously mentioned DE 33 04 710 A1.

EP 1 396 709 A1 thus discloses the arrangement of two flow-sensitive heating elements in a special housing in the flow in order to detect the flow direction independently of additional external information. This housing is designed such that, depending on the flow direction, the flow washes more strongly around one or the other heater and thus one or the other sensor is cooled more strongly.

This method allows independent flow direction detection. The additional housing and the additional sensor however imply a substantially increased effort for the production and operation of the sensor.

The proposition in accordance with EP 1 291 622 A2, in which only one flow-sensitive sensor is used, works in a similar vein. However, the sensor is located in a channel within a special sensor housing, with this channel having an inlet opening in the direction of the inlet flow, and an outlet which opens out to the side of the housing, so that a flow in the channel is caused by the ram pressure on the channel inlet and the sensor is thus only sensitive to flow in one direction.

In DE 10 2005 019 614 A1, a suitable housing also damps the pulsing flow to the sensor and partially suppresses it. However, the sensor for these methods is also quite complex, due to the required housing.

In contrast to the thermal mass flow meters described above, in which the cooling of the heater is used as the measuring effect, calorimetric thermal mass flow meters automatically also determine the flow direction, as shown in EP 1 310 775 A1, WO 2004/018976 A3 and EP 1 452 838 A2. In the case of calorimetric mass flow meters, in contrast to the to the principle described above, it is not the cooling of the heater that is measured, but rather there are two temperature sensors in the direct vicinity of the heater, one upstream and one downstream from the heater. In the case of a flow, the heat of the heater is transported by the flow to the downstream sensor and it registers a higher temperature. The flow velocity can then be determined from the temperature difference between the upstream sensor and the downstream sensor. If the flow direction of the flow changes, then the sign of the temperature difference correspondingly switches and the flow direction can be detected from this.

However, this measuring principle is limited to flows with a low Reynolds number, that is to say mainly laminar flows, since the heat in the flow is greatly distributed by the turbulence in the flow and the measuring effect is strongly reduced or even completely covered by the transport of heat in one direction. For this reason, only slow flows in narrow channels can be measured. In cases of higher fluid throughput, the sensitivity decreases and only corresponding by-pass solutions can be used here. These sensors are also generally produced with a low thermal mass in order to be able to react quickly and sensitively to the flow, so they are constructed in a correspondingly small and filigree manner. They are thus accordingly sensitive to external mechanical influences. For the field of application of large mass flow sensors described above, and also in severe environmental conditions, the are therefore unsuitable and can in general not be used as an alternative.

SUMMARY

Exemplary embodiments disclosed herein can make the known thermal mass flow meter capable of simple and reliable detection of flow direction.

A thermal mass flow meter is disclosed with at least two measuring elements immersed into a vessel with a flowing medium, with one of the measuring elements being heated, wherein the heated measuring element is arranged in front of the unheated measuring element in the flow direction of the medium for at least part of the time, and for part of the time the unheated measuring element is arranged in front of the heated measuring element.

A method of operation of a thermal mass flow meter is disclosed with at least two measuring elements immersed into a vessel with a flowing medium, with one of the measuring elements being heated, wherein the flow is measured by two measuring elements which are alternately heated intermittently, the measured values of the measuring elements are intermittently compared to one another, and the flow direction of the flow is detected from the differences between the measured values of the measuring elements in successive phases.

In another aspect, a method of operation of a thermal mass flow meter is disclosed, the method comprising: immersing measuring elements into a vessel carrying a flowing medium; alternately heating each one of the measuring elements, each one of the measuring elements being intermittently heated; measuring each one of the measuring elements which are alternately heated intermittently to derive measured values; intermittently comparing the measured values of the measuring elements to one another; and detecting a flow direction of the flowing medium based on the intermittent comparing of the measured values of the measuring elements in successive phases.

BRIEF DESCRIPTION OF THE DRAWINGS

The disclosure is explained in more detail below with reference to an exemplary embodiment. The drawings required for this show the following.

DETAILED DESCRIPTION

Figure 1:
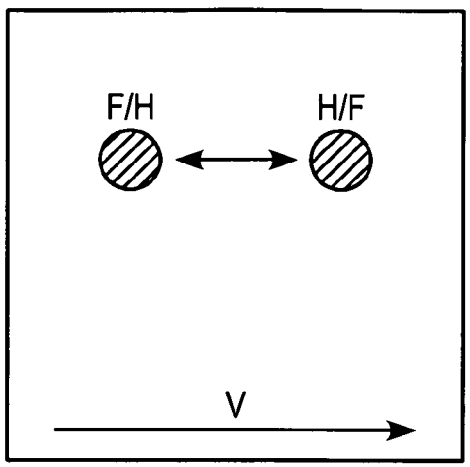
FIG. 1 shows an illustration of the principle of an exemplary measuring arrangement with two measuring elements.

To detect the direction of the thermal mass flow measurement according to the cooling principle, it is proposed to arrange the heater element and the sensor element behind one another in the direction of the flow and to operate the heater and sensor alternately as heater and sensor.

In the normal operating mode, the back element is used as a sensor to measure the fluid temperature, and the front sensor is used as a heater for the flow measurement. To determine the flow direction, the sensor and heater are now intermittently exchanged, and the front element is used as a heater. By heating an element the flow is now locally heated about the element, and this heat is transported on with the flow to the second element, which measures the fluid temperature. As a result of this, the second element measures a higher fluid temperature and the difference between the temperatures in the two modes of operation is used to detect the flow direction.

In this case, a similar effect to that of the calorimetric mass flow meter is used, but the second temperature sensor in front of the heater is dispensed with since the fluid temperature from the measurement prior to the sensor exchange is used. Work is also performed at much higher flow velocities, since high resolution for the flow measurement is not required, rather only direction detection is carried out.

The measurement can be carried out both statically with a constant heating power/temperature and also pulsed or with a temporally changing heating power. The latter has the advantage that a temperature difference between the measurements can be attributed to the heating of the flow by means of the heater. Since the heating power introduced is relatively quickly distributed in the flow by means of the turbulent flow around the heater, and thus the achievable temperature increase of the flow and the downstream temperature sensor can be small, depending on the construction and distance apart of the sensors, inaccuracies in the temperature measurement of the two sensors can influence the direction detection. However, if pulsed or temporally changing signals are used, with a simple change in the heating power already possibly sufficing in the case of temporarily changing signals, these signals can be amplified and made visible by means of a corresponding pattern recognition in the temperature measurement, for example by a look-in amplifier.

Since a corresponding waiting time has to be observed during the sensor change due to the inertia of the sensors, and the flow measurement must therefore be interrupted for a limited time, it is advantageous to only sporadically insert the direction detection into the measuring process. In particular, it makes sense to only carry out this measurement if the direction is unknown, or when a directional change is expected, that is to say in particular in the case of low flow velocities. The method is also more sensitive in this case. By way of example, the time at which direction detection is sensible could be determined by an analysis of the flow properties, as proposed in DE 33 04 710 A1.

In order to keep the suspension of the flow measurement due to the sensor change to a minimum, a flow measurement can also be carried out during the direction detection with exchanged sensors by using the heating power/temperature of the new heater for the flow measurement. In this case, corresponding temperature compensation has to take place for the flow measurement, since the current temperature sensor measures an increased fluid temperature in this measurement mode and thus would show an increased flow rate. However, on the other hand, this effect can be used in the flow measurement of the type which does not use the increased fluid temperature for direction detection, but rather uses this difference in the flow measurement in the case of exchanged heaters/sensors.

If pulsed or temporally changing heating power is used, the sensor change can even be completely dispensed with by always locating the heater in front of the temperature sensor. The heater is alternately operated at high and low heating power, so that the fluid is heated to different extents. In the phases with low heating power, the temperature sensor approximately takes on the temperature of the unheated fluid and the reference temperature can accordingly be determined. In the phases with high heating power, the direction detection is carried out.

Since the temperature measurement for the reference temperature can be influenced slightly even at small heating power, this temperature can also be corrected with the aid of a model of the system. In particular, if the heating power is sine-modulated for example, the amplitude of this sine-wave can thus be measured in the temperature sensor and it can subsequently be determined how much heat is transferred from the heater to the temperature sensor from the ratio of the amplitude of the modulated heating power to the measured amplitude at the temperature sensor. This information can be used to correspondingly correct the temperature measurement.

FIG. 1 shows an exemplary measuring arrangement in which two measuring elements, which are labeled F/H and H/F, are arranged one behind the other in the flow direction v. In the normal mode of operation, the measuring element toward the back in the expected flow direction is operated as a sensor F, and the measuring element toward the front in the expected flow direction is operated as a heater H. To determine the actual flow direction, the measuring element toward the back in the expected flow direction is operated as a heater H, and the measuring element toward the front in the expected flow direction is operated as a sensor F. The flow is measured in both modes of operation. The actual flow direction is determined from the difference of the measured values.

Figure 2:
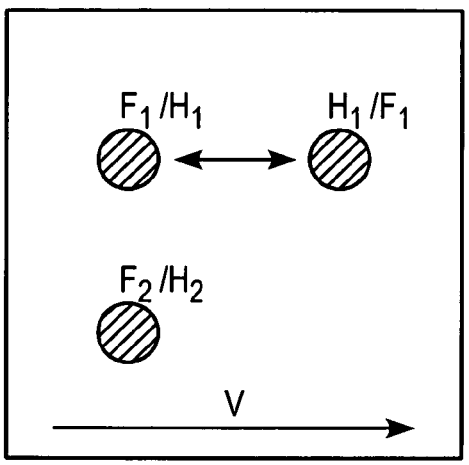
FIG. 2 shows an illustration of the principle of an exemplary measuring arrangement with three measuring elements.

FIG. 2 shows an exemplary measuring arrangement, in which two measuring elements, which are labeled $F_1/H_1$ and $H_1/F_1$, are arranged one behind the other in the flow direction v. Furthermore, a third measuring element $F_2/H_2$ is arranged outside of the flow over the first and second measuring elements $F_1/H_1$ and $H_1/F_1$.

In the normal mode of operation, the measuring element toward the back in the expected flow direction is operated as a sensor $F_1$, and the measuring element toward the front in the expected flow direction is operated as a heater $H_1$. To determine the actual flow direction, the measuring element toward the back in the expected flow direction is operated as a heater $H_1$, and the measuring element toward the front in the expected flow direction is operated as a sensor $F_1$. The flow is measured in both modes of operation. The actual flow direction is determined from the difference of the measured values. In this case, the third measuring element $F_2/H_2$ is operated as a sensor $F_2$ to measure the flow.

Furthermore, the third measuring element $F_2/H_2$ can periodically be heated for a short time. In this case, the third measuring element $F_2/H_2$ is operated as a heater $H_2$. By comparing the measured values of the third measuring element $F_2/H_2$ with the measured values of the first measuring element $F_1/H_1$ and/or of the second measuring element $H_1/F_1$, changes in the flow measurement caused by coating are detected, since the quantities of the depositions on the measuring elements differ due to different heating times.

The third measuring element $F_2/H_2$ can be positioned at any desired location, provided it is located outside of the heated flow behind the heater $H_1$.

Figure 3:
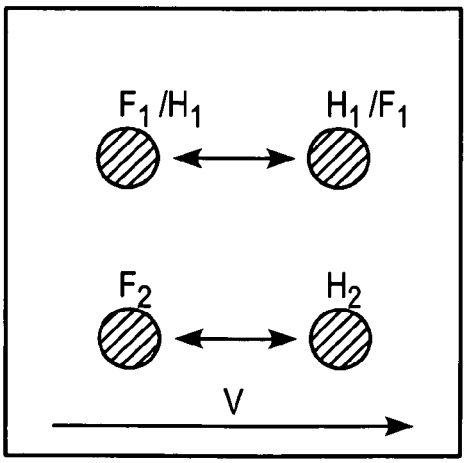
FIG. 3 shows an illustration of the principle of an exemplary measuring arrangement with two measuring element pairs.
Figure 4:
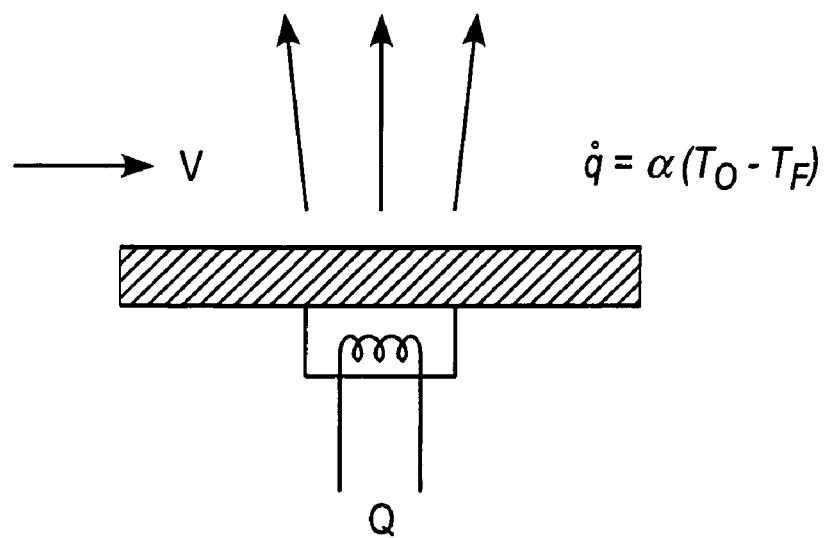
FIG. 4 shows an illustration of the principle of an exemplary thermal mass flow meter.
Figure 5:
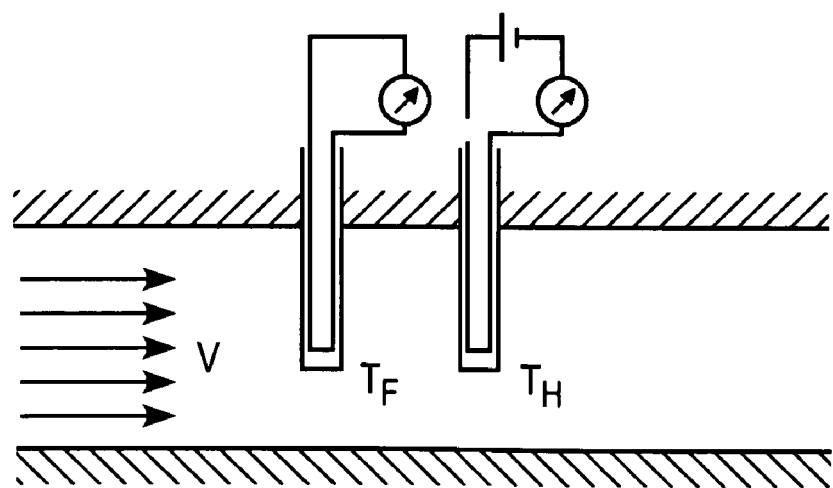
FIG. 5 shows an illustration of the principle of an exemplary measuring arrangement.

In a further exemplary refinement of the disclosure, FIG. 3 shows an exemplary measuring arrangement, in which two measuring elements, which are labeled $F_1/H_1$ and $H_1/F_1$, are arranged one behind the other in the flow direction v as a first pair. Furthermore, two further measuring elements, which are labeled $F_2$ and $H_2$, are arranged as a second pair outside of the flow over the first and second measuring elements $F_1/H_1$ and $H_1/F_1$.

In a first exemplary mode of operation, the measuring element of the first pair toward the back in the expected flow direction is operated as a heater $H_1$, and the measuring element of the first pair toward the front in the expected flow direction is operated as a sensor $F_1$. Thus the sensor $F_1$ is located behind the heater $H_1$ in the flow direction and measures an increased fluid temperature. The second pair of measuring elements $F_2$ and $H_2$ is arranged in the expected flow direction such that the sensor $F_2$ is located ahead of the heater $H_2$.

The actual flow direction is determined by comparing the measured values of the first pair and the second pair. Independently of the actual flow direction, the sensor is always in front of the heater in one of the pairs, and the sensor is always behind the heater in the other pair, so that there is always a difference in the measured values between the pairs.

In a second exemplary mode of operation, the position of the heater $H_1$ and the sensor $F_1$ of the first pair are exchanged. Now both sensors $F_1$ and $F_2$ are on the same side of the respective heaters $H_1$ and $H_2$ with respect to the flow direction.

Due to the change between the two modes of operation, different quantities of coatings form on the measuring elements operated as heaters, since the heater $H_2$ is always operated as a heater whereas the function of the heater $H_1$ is distributed among the two measuring elements of the first pair. By comparison of the measured values of the heaters $H_1$ and $H_2$, changes in the flow measurement due to the coating are detected.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A thermal mass flow meter with at least two measuring elements immersed into a vessel with a flowing medium, a first measuring element of the at least two measuring elements having a fixed position in the flowing medium relative to a second element of at least two measuring elements, wherein during a measuring interval, the first measuring element is a heated measuring element that is arranged upstream from the second measuring element, which is an unheated measuring element, in the flow direction of the medium for at least a first part of the interval, and for a second part of the interval the first measuring element is the unheated measuring element that is arranged upstream from the second measuring element, which is the heated measuring element.

2. The mass flow meter as claimed in claim 1, wherein the at least two measuring elements are arranged one behind the other in the flow direction.

3. The mass flow meter as claimed in claim 2,
wherein the at least two measuring elements can be heated alternately.

4. The mass flow meter as claimed in claim 1,
wherein the at least two measuring elements can be heated alternately.

5. The mass flow meter as claimed in claim 4,
wherein the flow of the flowing medium between the first and second measuring element is a first flow path, and wherein
a third measuring element is provided and arranged in a second flow path of the flowing medium, and wherein the third measuring element is periodically be heated for a short time.

6. The mass flow meter as claimed in claim 4,
wherein the flow of the flow medium between the first and second measuring elements, is a first flow stream and wherein
a third and a fourth measuring element are provided and arranged a second flow path and spaced apart in the flow direction of the flowing medium, with the third or fourth measuring element that is downstream with respect to the flow direction being heatable.

7. The mass flow meter as claimed in claim 1,
wherein the flow of the flowing medium between the first and second measuring elements is a first flow path, wherein
a third measuring element is provided and arranged in a second flow path, and wherein the third measuring element is periodically be heated for a short time.

8. The mass flow meter as claimed in claim 1
wherein the flow of the flowing medium between the first and second measuring elements is a first flow path, wherein
a third and a fourth measuring element are provided and arranged in a second flow path and spaced part in the flow direction of the flowing medium with the third or fourth measuring element that is downstream with respect to the flow direction being heatable.

9. A method of operation of a thermal mass flow meter with at least two measuring elements immersed and spaced apart in a flowing medium inside a vessel, each measuring element having a heated state and an unheated state,
wherein the flow is measured by the at least two measuring elements which are alternately in the heated state intermittently,
the measured values of the measuring elements are intermittently compared to one another, and
the flow direction of the flow is detected from the differences between the measured values of the measuring elements in successive phases.

10. The method as claimed in claim 9,
wherein the flow is measured with two pairs of measuring elements, one behind the other in the flow direction, with precisely one measuring element in each pair being heated and with the order of the heated and unheated measuring elements in the flow direction being different between the pairs,
the measured values of the pairs are compared to one another, and
the flow direction of the flow is detected from the differences between the measured values of the pairs.

11. A method of operation of a thermal mass flow meter, the method comprising:
immersing measuring elements into a vessel carrying a flowing medium;
alternately heating each one of the measuring elements, each one of the measuring elements being intermittently heated;
measuring each one of the measuring elements which are alternately heated intermittently to derive measured values;
intermittently comparing the measured values of the measuring elements to one another; and
detecting a flow direction of the flowing medium based on the intermittent comparing of the measured values of the measuring elements in successive phases.

* * * * *